United States Patent
Tejler et al.

(10) Patent No.: US 8,322,763 B2
(45) Date of Patent: Dec. 4, 2012

(54) FRONT BUMPER ARRANGEMENT FOR A TRUCK FOR SINGLE OR DUAL TOW POINTS

(75) Inventors: Kristina Tejler, Gothenburg (SE); Jorgen Marken, Copenhagen (DK)

(73) Assignee: Mack Trucks, Inc., Greensboro, NC (US)

( * ) Notice: Subject to any disclaimer, the term of this patent is extended or adjusted under 35 U.S.C. 154(b) by 204 days.

(21) Appl. No.: 12/667,748

(22) PCT Filed: Sep. 14, 2007

(86) PCT No.: PCT/US2007/020058
§ 371 (c)(1),
(2), (4) Date: Jan. 5, 2010

(87) PCT Pub. No.: WO2009/014526
PCT Pub. Date: Jan. 29, 2009

(65) Prior Publication Data
US 2010/0181786 A1  Jul. 22, 2010

Related U.S. Application Data

(60) Provisional application No. 60/961,733, filed on Jul. 24, 2007.

(51) Int. Cl.
*B60R 19/14* (2006.01)
(52) U.S. Cl. ..................................................... 293/155
(58) Field of Classification Search .................. 293/155, 293/102, 115, 117, 120, 121, 132, 133; 414/563
See application file for complete search history.

(56) References Cited

U.S. PATENT DOCUMENTS

| | | | |
|---|---|---|---|
| 1,236,487 A | 8/1917 | Sager | |
| 1,512,770 A | 10/1924 | Jakob | |
| 2,769,501 A | 11/1956 | Wagner | |
| 3,528,684 A | 2/1969 | Cowgill | |
| 3,490,386 A * | 1/1970 | Oranczak | 104/178 |
| 4,023,823 A | 5/1977 | Saunders | |
| 4,040,640 A | 8/1977 | Begg | |
| 4,111,449 A * | 9/1978 | Hancock | 280/402 |
| 4,385,779 A | 5/1983 | Kimura | |
| 4,579,364 A * | 4/1986 | Kranz | 280/507 |
| 4,634,168 A | 1/1987 | Fuchs | |
| 4,972,913 A | 11/1990 | Ray | |
| 4,974,891 A | 12/1990 | Furuta | |
| 5,054,806 A | 10/1991 | Chester | |
| 5,618,074 A | 4/1997 | Weast | |
| 5,620,198 A * | 4/1997 | Borchers | 280/507 |
| 5,716,066 A * | 2/1998 | Chou et al. | 280/501 |

(Continued)

FOREIGN PATENT DOCUMENTS

JP 60-124552 A1 7/1985

*Primary Examiner* — Kiran B Patel
(74) *Attorney, Agent, or Firm* — Martin Farrell; Michael Pruden

(57) ABSTRACT

An arrangement for mounting a front bumper extension to a truck includes a bracket having a mounting flange for mounting to a frame rail of a truck, and an upper flange and lower flange forming a pocket at a front end of the bracket for mounting a bumper center section. The bumper center section may be configured for a single tow pin with an aperture formed at a center of the bumper center section, or for dual tow pins with apertures formed to align with the pockets of respective right and left brackets.

3 Claims, 5 Drawing Sheets

U.S. PATENT DOCUMENTS

| | | | |
|---|---|---|---|
| 6,073,947 A * | 6/2000 | Gottschalk et al. | 280/124.128 |
| 6,193,274 B1 | 2/2001 | Brown | |
| 6,203,078 B1 | 3/2001 | Karrer | |
| 6,702,347 B1 | 3/2004 | Hollinger | |
| 7,090,267 B2 * | 8/2006 | Pendarvis | 293/155 |
| 7,121,574 B2 * | 10/2006 | Bouwkamp | 280/441.2 |
| 7,338,064 B1 * | 3/2008 | Williams | 280/491.3 |
| 7,815,211 B2 * | 10/2010 | Witchey | 280/491.5 |
| 2005/0236808 A1 * | 10/2005 | Lier et al. | 280/495 |
| 2009/0218834 A1 * | 9/2009 | Huber et al. | 293/155 |
| 2011/0001303 A1 * | 1/2011 | Brewer et al. | 280/495 |
| 2011/0101647 A1 * | 5/2011 | Williams et al. | 280/504 |
| 2011/0168961 A1 * | 7/2011 | Christiansen | 254/327 |
| 2011/0241311 A1 * | 10/2011 | Wergin | 280/491.2 |

* cited by examiner

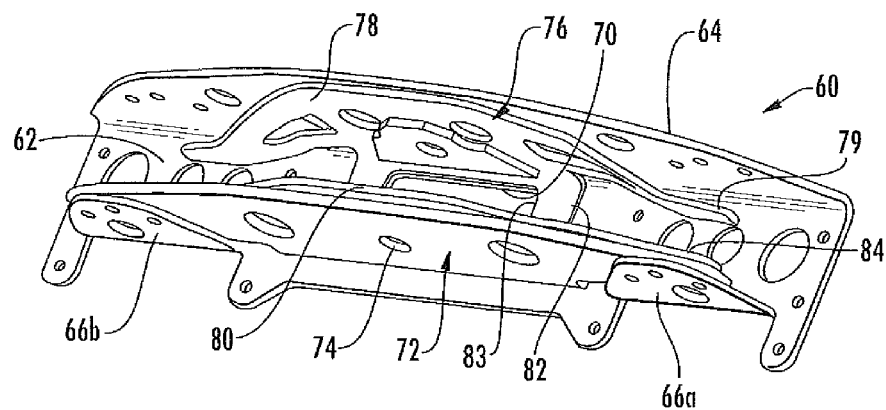
FIG. 11
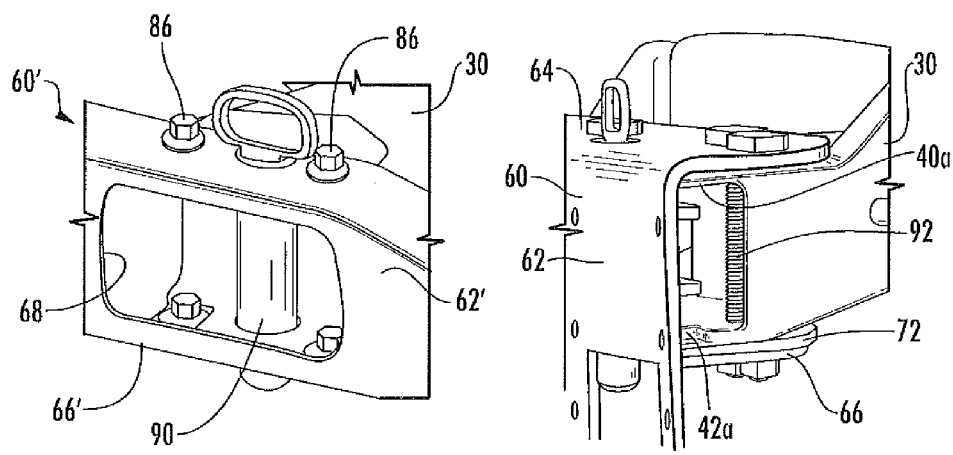
FIG. 10
FIG. 12

FRONT BUMPER ARRANGEMENT FOR A TRUCK FOR SINGLE OR DUAL TOW POINTS

FIELD OF THE INVENTION

The invention relates to apparatus for truck bumpers with integrated towing couplings, and more specifically, to an arrangement for a front bumper to a truck that is readily adaptable to accommodate a single tow point or dual tow point couplings.

BACKGROUND AND SUMMARY

Truck front bumpers are typically equipped with one or more tow points, a hook or pin that can be coupled with a hook, chain, or other coupling device of a towing vehicle in case the truck is disabled or otherwise needs to be towed. The tow points can be arranged laterally of the bumper center, usually one on each side near the frame rails, or as a single centrally located point.

A center located tow point and dual side located tow points require different structure to provide the tow coupling and accommodate the load of towing the truck. This has resulted in truck manufacturers having to design, make, and stock different parts for each of the assemblies. This adds cost and complexity to the manufacturer's systems.

The invention proposes an arrangement that accommodates single and dual tow points with a base structure of common components and a minimal number of components dedicated to single or dual tow. The arrangement in accordance with the invention provides simplicity that advantageously facilitates manufacturing and reduces the number of parts.

An arrangement in accordance with the invention includes a bracket mountable on the front end of the frame rails of a truck. One bracket is intended to be mounted on each frame rail. A single bracket is described here, and it will be understood that brackets according to the invention will be made as left and right hand versions for the left side and right side of the truck. The bracket is formed as a single piece, as a casting, for example, and includes a mounting flange for mounting to a frame rail. A hood mount support extends perpendicularly from the mounting flange to support a hood support rail. When the bracket is mounted on a frame rail, the hood mount support will extend toward a center of the truck.

An upper flange and a lower flange extend mutually parallel in a frontward direction of the bracket. According to a preferred embodiment, the upper flange and lower flange are substantially perpendicular to the mounting flange, and are formed contiguous with stiffening ribs formed on the mounting flange on a side opposite the side that engages a frame rail. The upper flange and lower flange define a pocket. For a dual tow point arrangement, the upper flange and lower flange each have a tow pin mounting hole, which holes are mutually aligned. With a tow pin installed in the holes in the upper flange and lower flange, the pocket provides space for a towing hook or chain to engage the tow pin and accommodate movement encountered during towing.

The upper flange and lower flange also include mounting holes for a center section that supports a bumper.

In accordance with another aspect of the invention, a center section is mountable to both right and left side brackets and spans a space therebetween. The center section is formed as a sheet bent to have a front face, a top face or flange that preferably extends a length of the center section and a bottom face or flange that may be formed as a single flange or two flanges. The top flange and bottom flange include mounting holes that align with and permit mounting the center section to the brackets. In an embodiment in which the bottom flange is formed as two flanges, each bottom flange aligns with a lower flange of the respective bracket.

The center section includes apertures for tow points. For the embodiment of dual tow points, the center section includes apertures located to align with the pockets defined by the upper flange and lower flange of the bracket.

For the embodiment of a single, center tow point, the center section includes an aperture at a center location. The top flange is formed with a hole for a tow pin. The embodiment further includes reinforcing plates for the towing pin. A bottom reinforcing plate is formed as an elongated plate with a centrally located hole for a tow pin. The bottom reinforcing plate is attached to the bottom face or flange of the center section. For a center section formed with two bottom flanges, the bottom reinforcing plate is attached to both and extends therebetween. The bottom reinforcing plate may be attached by welding, riveting or other suitable means.

A top reinforcing plate is preferably formed a plate bent in a U shape to have a top portion, a bottom portion and a web connecting the top and bottom. The top portion is overlapped by the top flange of the center section and is connected to it by welding, riveting or other suitable means. The web aligns with the center aperture and includes a hole co-extensive therewith. The bottom portion overlaps the bottom reinforcing plate and is preferably connected to it by welding, riveting or other suitable means.

BRIEF DESCRIPTION OF THE DRAWINGS

The invention will be better understood by reference to the following detailed description in conjunction with the appended drawings, in which:

FIG. 10 is an enlarged view of an end of the embodiment of FIG. 9 showing a mounting detail;

FIG. 11 is a rear view of a center section of the embodiment of FIG. 8; and,

FIG. 12 is an enlarged view of an end of the embodiment of FIG. 8 showing mounting details.

DETAILED DESCRIPTION

Figure 1:
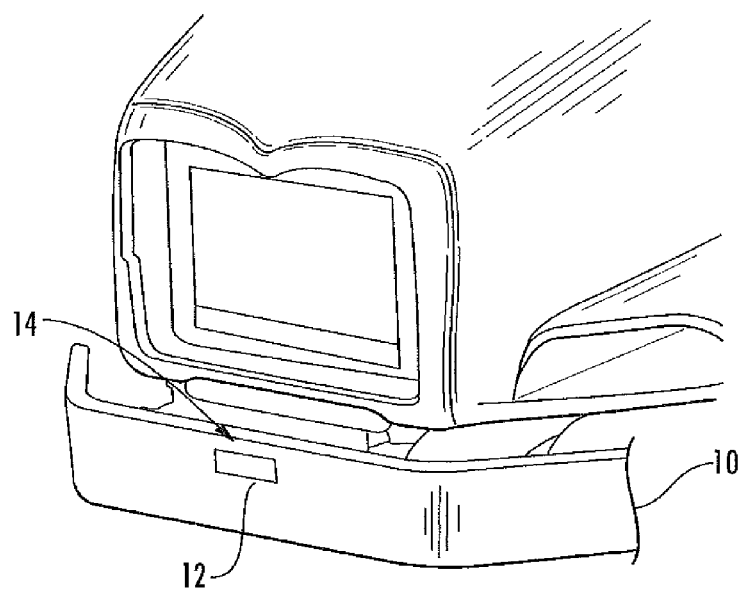
FIG. 1 is a view of a front end of a truck illustrating a single tow point arrangement.
Figure 2:
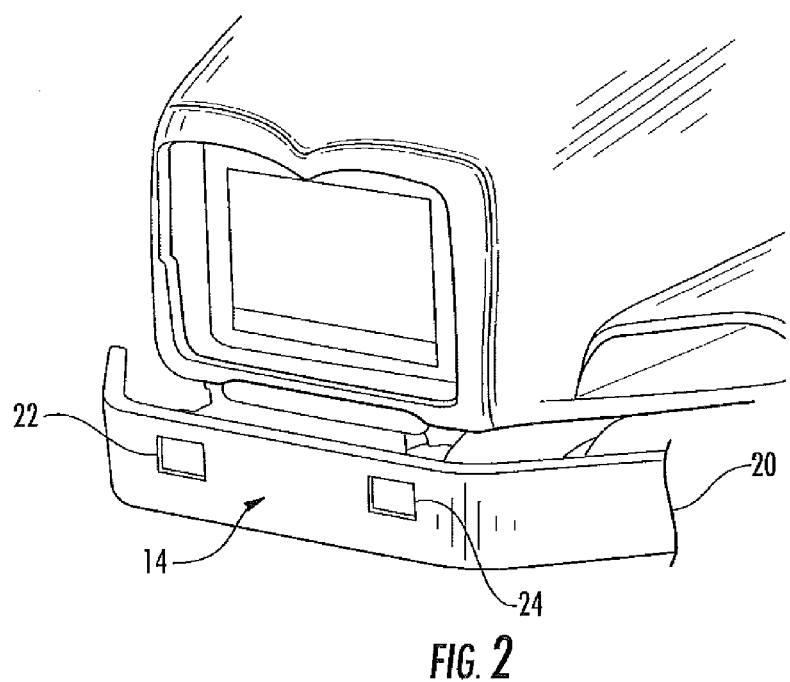
FIG. 2 is a view of a front end of a truck illustrating a dual tow point arrangement.

FIG. 1 and FIG. 2 show, respectively, a front bumper 10 of a truck with a single tow point 12 and a front bumper 20 with dual tow points 22, 24. The single tow point 12 of FIG. 1 is located at the center 14 of the bumper. The dual tow points 22, 24 are spaced on either side of the center 14 and located at approximately the location of the ends of the frame rails (not illustrated). Frame rails of truck frames are well known to those skilled in the art. See, for example, US Patent Application Publication No. 2010/0156082 and U.S. Pat. No. 6,712,393 to Philipps. The invention provides a front bumper arrangement including mounting brackets that are intended to be mounted on the ends of the frame rails at the front end of a truck; however, the frame rails do not make up part of the invention and will not be described here except as is necessary to provide context. As used herein, directions such as front, rear, upper, lower, top, bottom, left side, and right side refer to orientations of the bumper arrangement and brackets when mounted on a truck. For example, referring to FIG. 2, "front" refers to the illustrated front end of the truck, and accordingly, "rear" indicates an end opposite the front. "Upper" and "lower" refer to upper and lower directions of the devices when mounted, which are consistent with upper and lower directions in the figure. "Left" refers to the left side of the figure, and "right" refers to the right side of the figure. As will be understood by those skilled in the art, tow points must provide a coupling for a towing vehicle (typically by a hook or chain) and transmit the towing force to the frame of the truck. The invention provides an arrangement adaptable to either a single tow point or dual tow points with a minimum of components.

Figure 3:
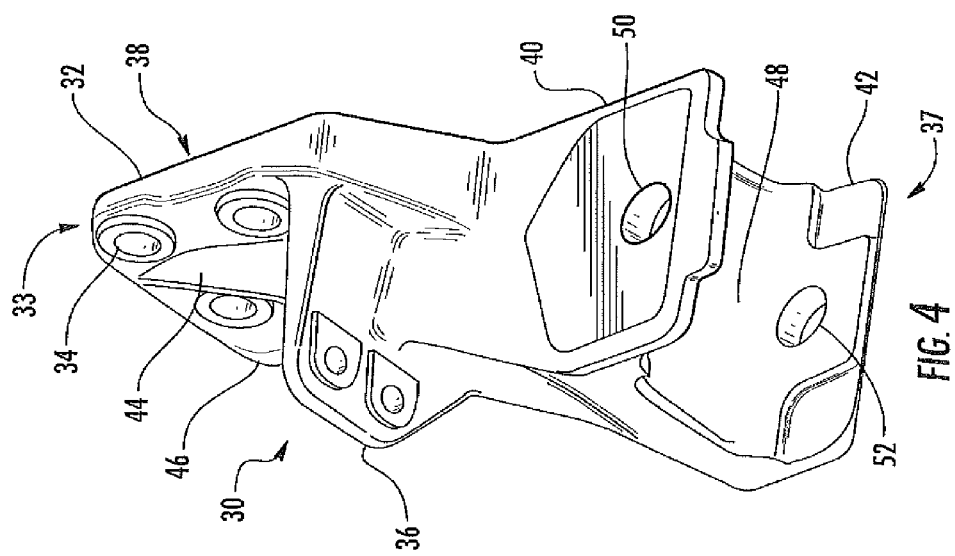
FIG. 3 is a top perspective view of a left side bracket for mounting a bumper arrangement to a frame rail in accordance with the invention.
Figure 4:
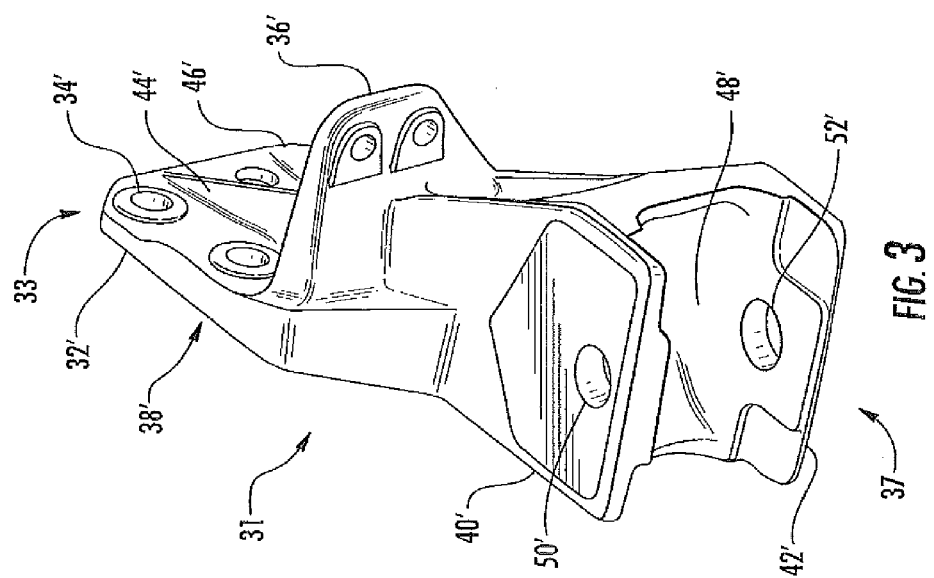
FIG. 4 is a top perspective view of a right side bracket for mounting a bumper arrangement to a frame rail in accordance with the invention.

An arrangement in accordance with the invention includes, illustrated in FIGS. 3 and 4, a bracket 30 mountable on a frame rail of a truck. FIG. 3 illustrates a left side (passenger side) bracket 31 and FIG. 4 illustrates a right side (driver side) bracket 30, referring to the side of the truck on which each bracket is intended to be installed. In the description that follows, a right side bracket as illustrated by FIG. 4 is described and illustrated, and it will be understood to apply to a left side bracket as illustrated by FIG. 3, similar features being identified in the figure by similar reference characters including a prime mark ('), with handedness or image being accordingly opposite that described in connection with the right side bracket of FIG. 4.

The bracket 30 is formed as a single piece, as a casting, for example, and includes at a rearward portion 33 a mounting flange 32 with a plurality of mounting holes 34 provided for mounting to a frame rail. A hood mount support 36 extends perpendicularly from a forward end of the mounting flange 32 to support a hood support rail 18 (illustrated in FIG. 8 and FIG. 9). When the bracket 30 is mounted on a frame rail, the hood mount support 36 will extend toward a center of the truck.

Figure 5:
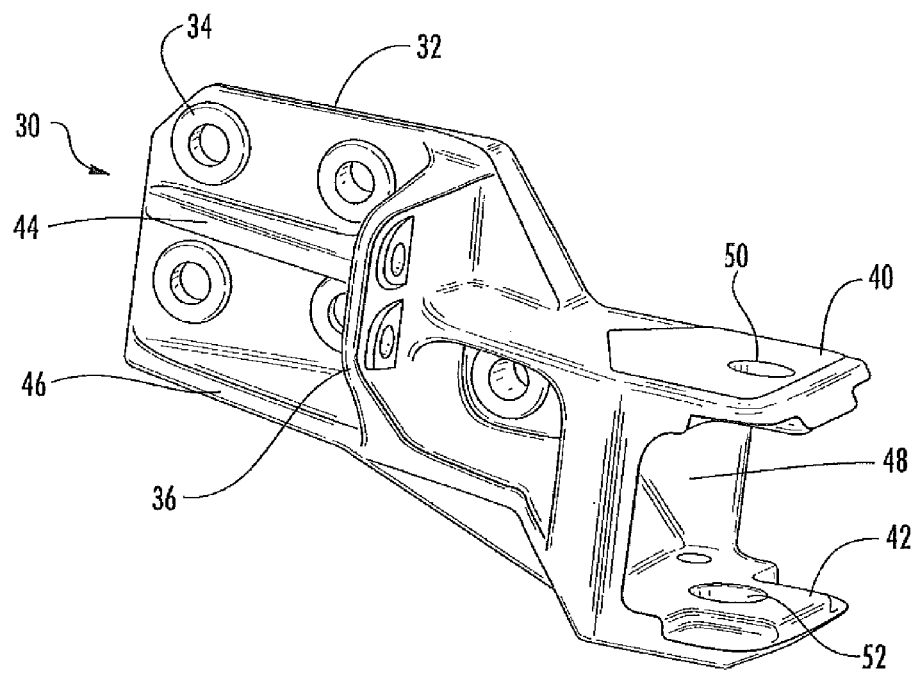
FIG. 5 is a side view of the bracket of FIG. 4.

At a forward end 37 of the bracket 30, an upper flange 40 and a lower flange 42, disposed below and spaced from the upper flange 40, extend mutually parallel (that is, parallel to each other) in a frontward direction away from the mounting flange 32. According to a preferred embodiment, the upper flange 40 and lower flange 42 are perpendicular to the mounting flange 32. Stiffening ribs 44, 46 are formed on the mounting flange 32 on a side opposite a side 38 that engages a frame rail. Referring now also to FIG. 5, which illustrates the bracket in side view, the upper flange 40 and lower flange 42 are substantially continuous with the stiffening ribs 44, 46 as forward projections of the stiffening ribs, which helps transmit towing forces from the upper flange and lower flange to the mounting flange 32.

The upper flange 40 and lower flange 42 define a pocket 48 in the space therebetween. For a dual tow point arrangement, the upper flange 40 and lower flange 42 each have a tow pin mounting hole 50, 52, respectively, which holes are mutually aligned. With a tow pin installed in the holes 50, 52 in the upper flange 40 and lower flange 42, the pocket 48 provides space for a towing hook or chain to couple with the tow pin.

Figures 6, 7:
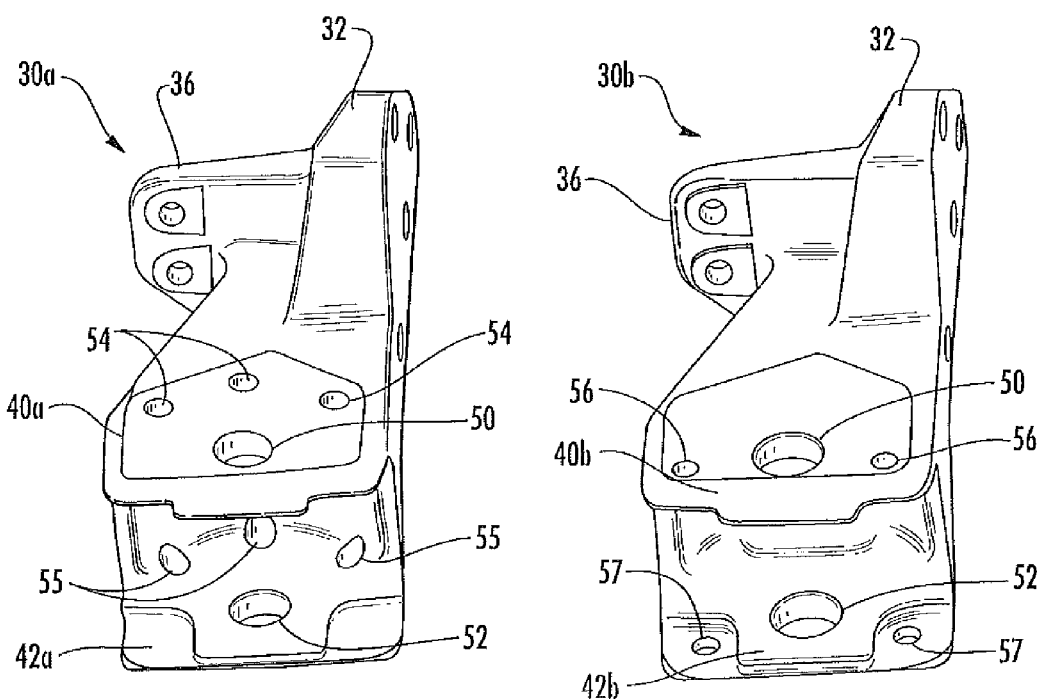
FIG. 6 is a front view of the bracket of FIG. 4 configured according to a first embodiment for a single tow point arrangement.
FIG. 7 is a front view of the bracket of FIG. 4 configured according to a second embodiment for a dual tow point arrangement.

The upper flange 40 and lower flange 42 also include mounting holes for a center section (described below) that supports a bumper. FIG. 6 shows an embodiment of a bracket 30a including a mounting hole arrangement for a center section for a single tow point arrangement, including three holes 54 in the upper flange 40a and three holes 55 in the lower flange 42a. FIG. 7 shows an embodiment of a bracket 30b including a mounting hole arrangement for center section for a dual tow point arrangement, including two holes 56 in the upper flange 40b and two holes 57 in the lower flange 42b.

For convenience, the bracket 30 may be formed with the tow pin mounting holes 50, 52 as part of the casting or forming process, although the single tow point arrangement will not use these holes. However, it is possible to omit the two point mounting holes in the forming process and machine them only into brackets to be used for the dual tow point arrangements.

Figure 8:
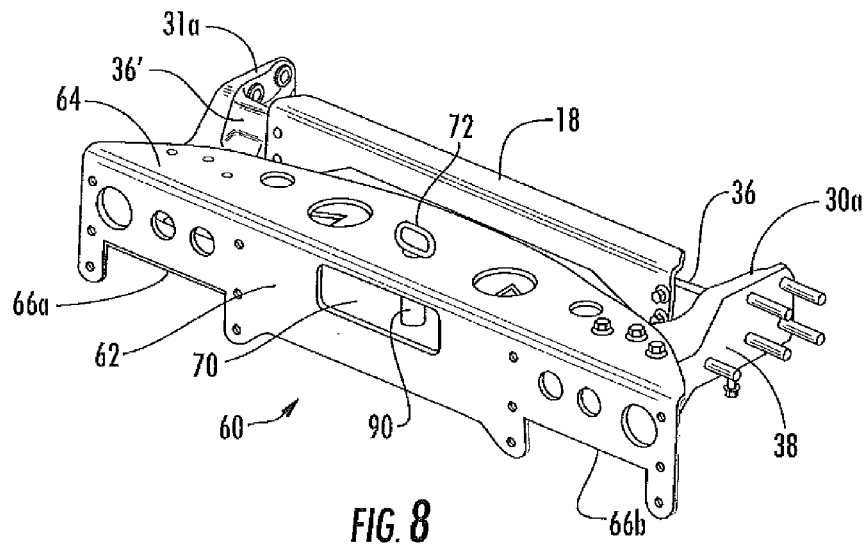
FIG. 8 is a front perspective view of an assembly in accordance with an embodiment of the invention for a single tow point arrangement.
Figure 9:
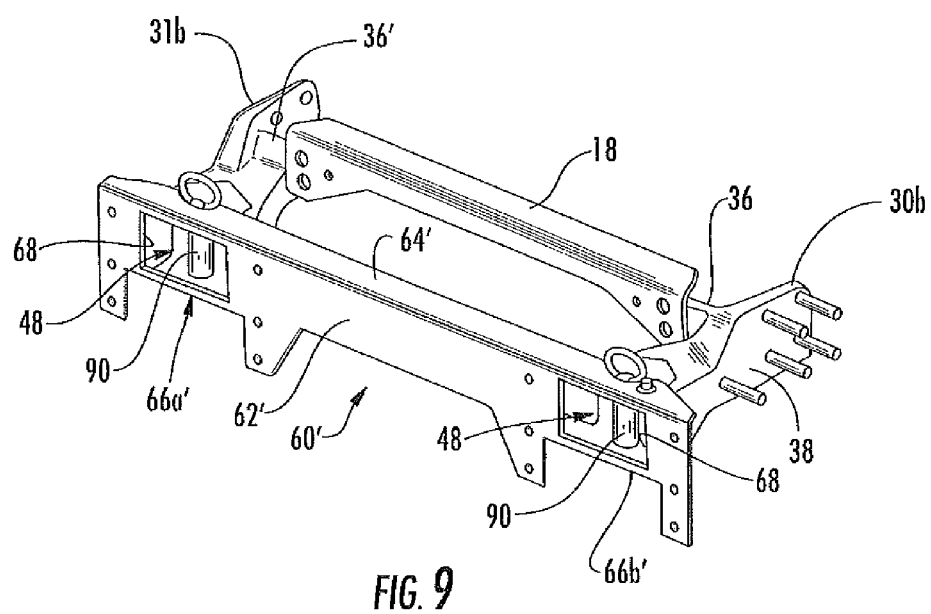
FIG. 9 is a front perspective view of an assembly in accordance with an embodiment of the invention for a dual tow point arrangement.

Turning now to FIG. 8 and FIG. 11, which show a single tow point arrangement assembly, and FIG. 9, which shows a dual tow point arrangement assembly, another aspect of the invention is described. For both the single tow point arrangement and the dual tow point arrangement a center section is mounted to the right side 30a and left side 31a brackets and spans a space therebetween. FIGS. 8 and 9 also illustrate a hood support bar 18 mounted to the hood mount supports 36, 36' respectively, on the brackets 30a, 31a by two threaded fasteners on each side.

Referring to FIGS. 8 and 11, and the embodiment of a single tow point attachment bumper, the center section 60 is formed as a sheet, preferably metal, bent or formed to have a front face 62, a top face 64 that preferably extends a length of the center section and a bottom face 66 that may be formed as a single flange or two flanges. As best seen in FIG. 11, the bottom face 66 in the figures comprises two faces or flanges 66a, 66b. The top face and bottom face include mounting holes that align with the mounting holes in the brackets 30, 31 and permit mounting the center section to the brackets. Turning now to FIG. 9, the center section 60' for the dual tow point arrangement, similarly includes a front face 62', a top face 64', and a bottom face 66', the bottom face preferably formed as two spaced flanges 66a' and 66b'. In an embodiment in which the bottom flange is formed as two flanges, each bottom flange aligns with a lower flange of the respective bracket, as may be seen in FIGS. 8 and 9.

In both of the embodiments of FIG. 8 and FIG. 9, the center section 60, 60' mounts to the brackets 30, 31 with the top face 64, 64' and bottom face 66, 66' engaging on opposite sides and enclosing the upper flange 40, 40' and lower flange 42, 42' of the respective brackets 30, 31. For the dual tow point arrangement, shown in partial view in FIG. 10, the center section 60' is attached by fasteners 86 in the mounting holes 56 formed in the upper flange 40 and the mounting holes 57 formed in the lower flange 42 to provide clearance for towing hook up components. FIG. 10 also shows a tow pin 90 installed in the bracket 30 and extending through holes in the upper face 64' and lower face 66' of the center section 60' and the upper flange 40 and lower flange 42 of the bracket 30.

For the embodiment of dual tow points, shown in FIG. 9, the center section 60' includes apertures 68 located to align with the pockets 48 defined by the upper flange 40, 40' and lower flange 42, 42' of the respective bracket 30, 31.

For the embodiment of a single, center tow point illustrated in FIG. 8 and in rear view in FIG. 11, the center section 60 includes an aperture 70 at a center location. The top face 64 of the center section 60 is formed with a hole 72 for a tow pin. Referring to FIG. 11, the single tow point embodiment center section 60 further includes reinforcing plates. A bottom reinforcing plate 72 is formed as an elongated plate with a centrally located hole 74 for a tow pin. The bottom reinforcing plate 72 is attached to the bottom face 66 or flange of the center section. For a center section 50 formed with two bottom flanges 66a, 66b as shown in the drawings, the bottom reinforcing plate 72 is attached to both bottom flanges 66a, 66b and extends therebetween. The bottom reinforcing plate 72 and bottom flanges 66a, 66b may be attached by welding, riveting or other suitable means.

A top reinforcing plate 76 is preferably formed as an elongated plate bent in a U shaped profile to have a top plate 78, a bottom plate 80 and a web 82 connecting the top and bottom plates. The top plate 78 has a relative wide center and is tapered at its lateral end portions and ramped away from the top face 64 to avoid interfering with the side brackets 30, 31. The top plate 78 is in contact with and overlapped by the top face 64 of the center section 60 and is connected to it by welding, riveting or other suitable means. The tapered end portions 79 of the top plate 78 are welded to the front face 62 of the center section 60. The web 82 aligns with front face 62 of the center section and includes a hole 83 aligned with the center aperture 70 and co-extensive therewith. The bottom plate 80 is in contact with and overlaps the bottom reinforcing plate 72 and is preferably connected to it by welding, riveting or other suitable means. The bottom plate 80 includes tapered end portions 84 ramped away from the bottom face 66 which are welded to the front face 64 of the center section 60. As may be seen in FIG. 11, a tow pin 90 extends through the top face 64 of the center section, the top plate 78 and bottom plate 80 of the top reinforcement plate 76, and the bottom reinforcing plate 72. This arrangement transmits towing force to the center section 60 and accordingly to the brackets 30, 31.

FIG. 12 shows a partial view of the single tow point arrangement to illustrate how the center section 60 is attached to the side bracket 30. As noted in connection with FIG. 6, there are three mounting holes (not visible in FIG. 12) in each of the upper flange 40 and lower flange 42 of the bracket for the single tow point arrangement. Returning to FIG. 12, the top face 64 and the bottom face 66 of the center section 60 are positioned on opposite sides of the upper flange 40 and the lower flange 42 to enclose the upper flange 40 and lower flange 42 of the bracket 30, and an end of the bottom reinforcing plate 72 is positioned between the lower flange 42 and the bottom face 66. Fasteners, in this case threaded bolts, extend through holes aligned in the top face 64, upper flange 40, lower flange 42, bottom reinforcing plate 78, and bottom face 66, with one fastener 92 visible in the view of FIG. 12.

The center section 60 may be formed with apertures for both the single tow point and dual tow points for convenience, or may be formed as a dedicated part for one arrangement.

A bumper, as illustrated in FIG. 1 and FIG. 2, will be mounted on the center section. The bumper will include a tow point access hole for the arrangement installed on a particular truck.

The invention has been described in terms of preferred principles and embodiments, however, those skilled in the art will appreciate that substitutions of equivalents may be made without departing from the scope of the invention as defined in the appended claims.

We claim:

1. A front bumper arrangement for a tractor truck having a frame including a left frame rail and a right frame rail, comprising:
    a bumper center section extending from a left end to a right end and having a front face, a top face, a left bottom face, and a right bottom face, and having at least one tow hook access point aperture in the front face;
    a left side bracket mounted on a left end of the bumper center section, the left side bracket having a mounting flange at a rear end, an upper flange and a lower flange extending at a front end opposite the rear end, the upper flange and the lower flange being spaced to define a pocket therebetween, each upper and lower flange having a tow pin mounting hole, and a hood support flange extending perpendicular to the mounting flange, wherein, the left side bracket is mounted to the bumper center section with the left bottom face of the bumper center section connected to the lower flange and the top face of the bumper center section connected to the upper flange;
    a right side bracket mounted on a right end of the bumper center section, the right side bracket having a mounting flange at the rear end, an upper flange and a lower flange extending at a front end opposite the rear end, the upper flange and the lower flange being spaced to define a pocket therebetween, each upper and lower flange having tow pin mounting hole, and a hood support flange extending perpendicular to the mounting flange, wherein, the right side bracket is mounted to the bumper center section with the right bottom face of the bumper center section connected to the lower flange and the top face of the bumper center section connected to the upper flange; and,
    a hood support bar mounted to the hood support flanges of the left side bracket and right side bracket.

2. The front bumper arrangement as claimed in claim 1, wherein the bumper center section has two spaced apertures formed in the front face for the tow hook access points, the spaced apertures aligning with the pockets defined by the respective upper flange and lower flange of the mounting brackets.

3. The front bumper arrangement of claim 2, further comprising a tow pin mounted in the mutually aligned holes of each side bracket.

* * * * *